US010352521B2

(12) United States Patent
Schmidt et al.

(10) Patent No.: US 10,352,521 B2
(45) Date of Patent: Jul. 16, 2019

(54) VEHICLE LAMP

(71) Applicant: OSRAM GmbH, Munich (DE)

(72) Inventors: Tobias Schmidt, Garching (DE); Stephan Malkmus, Puchheim (DE)

(73) Assignee: OSRAM GmbH, Munich (DE)

( * ) Notice: Subject to any disclaimer, the term of this patent is extended or adjusted under 35 U.S.C. 154(b) by 236 days.

(21) Appl. No.: 15/403,222

(22) Filed: Jan. 11, 2017

(65) Prior Publication Data

US 2017/0211770 A1 Jul. 27, 2017

(30) Foreign Application Priority Data

Jan. 27, 2016 (DE) ........................ 10 2016 201 158

(51) Int. Cl.

| | |
|---|---|
| ***G02B 27/00*** | (2006.01) |
| ***F21S 41/19*** | (2018.01) |
| ***F21S 41/143*** | (2018.01) |
| ***F21S 41/20*** | (2018.01) |
| ***F21S 41/24*** | (2018.01) |
| ***F21S 41/43*** | (2018.01) |
| *F21S 45/47* | (2018.01) |

(52) U.S. Cl.

CPC ........... *F21S 41/192* (2018.01); *F21S 41/143* (2018.01); *F21S 41/24* (2018.01); *F21S 41/285* (2018.01); *F21S 41/435* (2018.01); *F21S 45/47* (2018.01)

(58) Field of Classification Search

CPC ....... F21K 9/232; G02B 6/0008; G02B 6/001; G02B 6/262

See application file for complete search history.

(56) References Cited

U.S. PATENT DOCUMENTS

| | | | | | |
|---|---|---|---|---|---|
| 7,386,203 | B2 * | 6/2008 | Maitland | G02B 6/0008 | 385/141 |
| 8,482,186 | B2 * | 7/2013 | Wang | G02B 6/0096 | 313/116 |
| 2007/0297190 | A1 * | 12/2007 | Ng | A61N 5/0601 | 362/558 |
| 2008/0158905 | A1 * | 7/2008 | Chuang | C03C 25/6208 | 362/581 |

(Continued)

FOREIGN PATENT DOCUMENTS

| | | |
|---|---|---|
| DE | 112004001245 B4 | 3/2012 |
| DE | 102011051541 A1 | 1/2013 |

(Continued)

OTHER PUBLICATIONS

German Search Report based on application No. 10 2016 201 158.8 (8 pages) dated Oct. 3, 2016 (for reference purpose only).

*Primary Examiner* — Andrew J Coughlin

(74) *Attorney, Agent, or Firm* — Edward S. Podszus

(57) ABSTRACT

In various embodiments, a vehicle lamp is provided. The vehicle lamp includes at least one semiconductor light source, at least one light emission body, and a concentrator arranged between the at least one semiconductor light source and the respective light emission body. A larger light entrance area of the concentrator is separated from the at least one semiconductor light source by a gap. The concentrator at its smaller light exit area transitions into the light emission body. The light emission body has at least one region covered with a partly transmissive layer.

18 Claims, 4 Drawing Sheets

(56) References Cited

U.S. PATENT DOCUMENTS

| | | | | |
|---|---|---|---|---|
| 2008/0198603 | A1 * | 8/2008 | Sormani | F21K 9/00 362/259 |
| 2011/0044070 | A1 * | 2/2011 | Takahashi | G02B 6/0008 362/553 |
| 2014/0029285 | A1 | 1/2014 | Bittinger et al. | |

FOREIGN PATENT DOCUMENTS

| | | | |
|---|---|---|---|
| DE | 102012023264 | A1 | 6/2014 |
| WO | 2005001332 | A1 | 1/2005 |
| WO | 2012139880 | A1 | 10/2012 |

* cited by examiner

VEHICLE LAMP

CROSS-REFERENCE TO RELATED APPLICATION

This application claims priority to German Patent Application Serial No. 10 2016 201 158.8, which was filed Jan. 27, 2016, and is incorporated herein by reference in its entirety.

TECHNICAL FIELD

Various embodiments relate generally to a vehicle lamp, including at least one semiconductor light source and at least one light emission body and a concentrator arranged between the at least one semiconductor light source and the respective light emission body. Various embodiments are applicable, for example, to replacement lamps (retrofit lamps), e.g. for replacing conventional lamps having incandescent filaments, e.g. vehicle halogen incandescent lamps, in particular of the H-type, e.g. H7.

BACKGROUND

WO 2012/139880 A1 discloses a semiconductor incandescent lamp retrofit lamp, that is to say a replacement lamp for replacing conventional incandescent lamps, e.g. vehicle halogen incandescent lamps, by using semiconductor light sources, e.g. light emitting diodes (LEDs). The semiconductor incandescent lamp retrofit lamp includes at least one semiconductor light source and at least one light scattering body, into which light from the at least one semiconductor light source can be coupled, wherein the at least one light scattering body is configured and arranged to emit substantially diffusely the light fed to it from the at least one semiconductor light source.

SUMMARY

In various embodiments, a vehicle lamp is provided. The vehicle lamp includes at least one semiconductor light source, at least one light emission body, and a concentrator arranged between the at least one semiconductor light source and the respective light emission body. A larger light entrance area of the concentrator is separated from the at least one semiconductor light source by a gap. The concentrator at its smaller light exit area transitions into the light emission body. The light emission body has at least one region covered with a partly transmissive layer.

BRIEF DESCRIPTION OF THE DRAWINGS

The above-described properties, features and advantages of this invention and the way in which they are achieved will become clearer and more clearly understood in association with the following schematic description of an exemplary embodiment explained in greater detail in association with the drawings. In this case, identical or identically acting elements may be provided with identical reference signs for the sake of clarity.

DESCRIPTION

Figure 1:
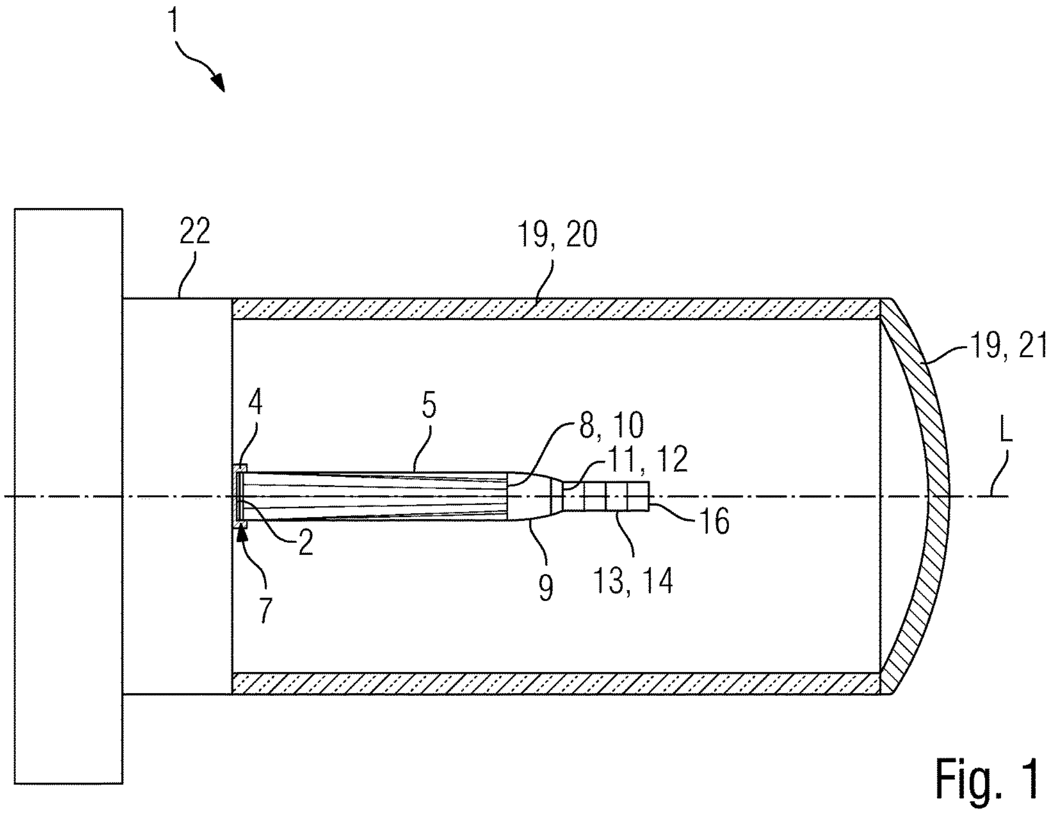
FIG. 1 shows, as a sectional illustration in side view, components of a vehicle lamp for replacing a conventional vehicle halogen incandescent lamp.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Various embodiments at least partly overcome the disadvantages of the prior art and, for example, provide a replacement lamp which is mountable particularly simply, which is producible inexpensively and which has a light emission characteristic which is very similar to a light emission characteristic of the conventional lamp.

Various embodiments provide a lamp, e.g. for use with a vehicle (hereinafter also referred to as "vehicle lamp", without restricting the generality), including at least one semiconductor light source, at least one respective light emission body and a concentrator arranged between the at least one semiconductor light source and the respective light emission body. A larger light entrance area of the concentrator is separated from the at least one semiconductor light source by a gap, the concentrator at its smaller light exit area transitions into the light emission body, and the light emission body has at least one light-transmissive region covered with a partly transmissive layer.

This vehicle lamp may have the effect that it is producible inexpensively with a small number of robust parts and is mountable in a simple manner. Moreover, the light emission characteristic of the light emitted by the light emission body can be set using simply implementable means such that it is very similar to the light emission characteristic of the conventional lamp. One effect of a partly transmissive layer is that it can be used to set the transmittance particularly accurately. Furthermore, non-transmitted light is reflected back into the light emission body. Moreover, a transmittance can be dependent on an angle of incidence of the light incident thereon, such that the light emission characteristic is also settable depending on the angle of incidence. That region of the surface of the light emission body through which light is intended to pass toward the outside in order to serve as useful light of the vehicle lamp can hereinafter also be referred to as "light emission area". The light emission body can thus have at least one light emission area covered with a partly transmissive layer.

The vehicle lamp is, in particular, a retrofit lamp for replacing conventional vehicle lamps, e.g. vehicle halogen incandescent lamps, in particular of the H-type, e.g. H4 or H7. For this purpose, it may include a base that fits into a corresponding lampholder. It can also have an outer contour or form factor similar to the conventional lamp. The vehicle lamp can be provided as an illuminant for a vehicle headlight.

The vehicle can be a motor vehicle (e.g. an automobile such as a car, truck, bus, etc. or a motorcycle), a train, a watercraft (e.g. a boat or a ship) or an aircraft (e.g. an airplane or a helicopter).

In one development, the at least one semiconductor light source includes or has at least one light emitting diode. If a plurality of light emitting diodes are present, they can emit light in the same color or in different colors. A color can be monochromatic (e.g. red, green, blue, etc.) or multichromatic (e.g. white). Moreover, the light emitted by the at least one light emitting diode can be an infrared light (IR LED) or an ultraviolet light (UV LED). A plurality of light emitting diodes can generate a mixed light; e.g. a white mixed light.

The at least one light emitting diode can be present in the form of at least one individually packaged light emitting diode or in the form of at least one light emitting diode (LED) chip. The at least one LED chip can be a surface emitting chip, e.g. a so-called top LED. A plurality of LED chips can be mounted on a common substrate ("submount"). By way of example, a light emitting surface of the LED chips can be in each case approximately one square millimeter. In one development, the light emission areas of the LED chips are arranged parallel to the light entrance area of the concentrator.

The at least one light emitting diode can contain at least one wavelength-converting phosphor (conversion LED). By way of example, a surface of the LED chip that emits—e.g. blue—primary light can be covered with a lamina composed of ceramic phosphor. The phosphor can alternatively or additionally be arranged at a distance from the light emitting diode ("remote phosphor"). A phosphor is suitable for converting the incident primary light at least partly into secondary light having a different wavelength—e.g. yellow. If a plurality of phosphors are present, they may generate secondary light of mutually different wavelengths. The wavelength of the secondary light may be longer (so-called "down conversion") or shorter (so-called "up conversion") than the wavelength of the primary light. By way of example, blue primary light may be converted into green, yellow, orange or red secondary light by a phosphor. In the case of an only partial wavelength conversion, the phosphor emits a mixture of secondary light and non-converted primary light, which mixture can serve as useful light. By way of example, white useful light may be generated from a mixture of blue, non-converted primary light and yellow secondary light. However, a full conversion is also possible, in the case of which the primary light either is no longer present in the useful light or is present in a merely negligible proportion therein. A degree of conversion is dependent, for example, on a thickness and/or a phosphor concentration of the phosphor. If a plurality of phosphors are present, secondary light portions having different spectral compositions, e.g. yellow and red secondary light, can be generated from the primary light. The red secondary light may be used for example to give the useful light a warmer hue, e.g. so-called "warm-white". If a plurality of phosphors are present, at least one phosphor may be suitable for subjecting secondary light to wavelength conversion again, e.g. green secondary light into red secondary light. Such light subjected to wavelength conversion again from secondary light may also be referred to as "tertiary light".

The at least one light emitting diode can be equipped with at least one dedicated and/or common optical unit for beam guiding, e.g. at least one Fresnel lens, collimator, and so on.

Instead of or in addition to inorganic light emitting diodes, e.g. on the basis of InGaN or AlInGaP, etc., in general organic LEDs (OLEDs, e.g. polymer OLEDs) can also be used. Alternatively, the at least one semiconductor light source may include e.g. at least one diode laser.

A light emission body is configured to emit light coupled into it toward the outside, specifically e.g. with a light emission characteristic similar to an incandescent filament. The light emission body can in particular also be referred to and used as a "virtual incandescent filament". In one development, the light emission body is arranged at a position which corresponds to a position of the conventional incandescent filament to be replaced. In one development that is advantageous for imitating a conventional incandescent filament, the light emission body has a cylindrical shape and light from the concentrator is coupled into an end area of the light emission body. Light may be emitted via the lateral surface of the light emission body. In this case, for applications in automotive headlight lighting, a (cumulative) color locus of the light emitted by the light emission body advantageously lies in the ECE white field standardized therefor.

The concentrator is designed e.g. such that light is coupled in via its larger light entrance area and—as far as possible without any losses—at its smaller light exit area crosses directly or indirectly (e.g. via an intermediate element) into the light emission body. The concentrator can be, in particular, a light guiding body that tapers in the light passage direction. The light entrance area and the light exit area are situated opposite one another, for example. From the light entrance area to the light exit area, the light is guided in the concentrator practically without any losses, e.g. if the light guiding in the concentrator is achieved by total internal reflection (TIR). In this case, light can be reflected at the side wall of the concentrator, e.g. by the provision of a reflective layer, by total internal reflection and/or by Fresnel reflection. A side wall can be understood to mean, for example, the surface of the concentrator outside the light entrance area and the light exit area. The light emerging at the light exit area crosses into the light emission body, specifically without any gaps.

The light entrance area of the concentrator can be separated from the at least one semiconductor light source by the gap directly or indirectly (e.g. with the presence of a light guiding adapter present between the concentrator and the gap).

The fact that the concentrator at its light exit area transitions into the light emission body encompasses, for example, this taking place without any gaps, that is to say that no gap is present between the concentrator and the light emission body. The concentrator at its light exit area can transition into the light emission body directly or immediately, or it can transition into the light emission body indirectly, e.g. via an intermediate element (but without any gaps).

A gap can be understood to mean, in particular, a space between two solids. The space can exist in a vacuum or under reduced pressure, be filled with gas (e.g. with air or noble gas) or be filled with liquid. This makes use of the fact that the refractive index of the gap or of the region directly in front of the at least one light source should be as low as possible for reasons of etendue. Gases have particularly low refractive indices. A gas can also be understood to mean a gas mixture. A gas having better thermal conductivity than air can also be used (e.g. helium or a mixture including helium).

In one configuration, the light emission body is covered with a plurality of partly transmissive layers having different transmittances. As a result, it is possible to accurately set a light passage through different regions of its surface and it is thus also possible to set its light emission characteristic particularly accurately.

At least one partly transmissive layer may consist e.g. of alternating plies having higher and lower refractive indices. It can be, for example, a dichroic layer. Dichroic layers consist of a multiplicity of optically low refractive index and optically high refractive index layers. The layers composed of a material having a low refractive index may include a material consisting of an oxide or a nitride or an oxynitride including one of the elements Si, Zr, Al, Sn, Zn and/or mixtures thereof. One exemplary material for the layer composed of a material having a low refractive index is $SiO_2$. The layers composed of a material having a high refractive index in the dichroic layer system may include a material consisting of an oxide or a nitride or an oxynitride including one of the metals Nb, Ti, Ta, Hf and/or mixtures thereof. It has proved to be particularly efficient to use $Nb_2O_5$ in the layer system.

At least one partly transmissive layer which has an identical transmissivity or an identical transmittance for each wavelength of the light passing through is particularly efficient for a uniform light emission.

At least one partly transmissive layer can be a thin metallic layer, e.g. a silver layer or an aluminum layer. A different transmittance can be set e.g. by means of a layer thickness.

At least one partly transmissive layer can have a constant transmittance in some regions. Alternatively or additionally, at least one partly transmissive layer can have a transmittance that changes continuously or quasi-continuously (in imperceptible steps), or constitute a gradient layer with regard to the transmittance.

In another configuration, the partly transmissive layers have a higher transmittance with greater distance from the light exit area of the concentrator. As a result, the light emission body can emit a luminous flux that is uniform similarly to an incandescent filament over a length of the light emission body. If the light emission body is cylindrical, the partly transmissive layers can be arranged alongside one another in a ring-shaped fashion on the lateral surface. The cylindrical light emission body can thus have corresponding disk-shaped sections which emit light toward the outside with different transmittances. In various embodiments, a transmittance can increase with increasing distance from the light entrance area of the light emission body.

In principle, the partly transmissive regions can merge into one another gradually, i.e. for example without a greatly pronounced jump in their transmittance, or abruptly. In various embodiments, it is also possible to use only a partly transmissive gradient layer. The partly transmissive regions can have identical widths and/or different widths. The outer side of the light emission body need not be covered or coated completely with partly transmissive regions; in this regard, for example, a region of the light emission area that is the furthest away from the light exit area of the concentrator or from the light entrance area of the light emission body may not be covered.

In a further configuration, a first transmittance Ta of a partly transmissive layer closest to the light exit area of the concentrator or to the light entrance area of the light emission body, a second transmittance Tb of a partly transmissive layer further away from the light exit area of the concentrator and a third transmittance Tc of a partly transmissive layer even further away from the light exit area of the concentrator become progressively greater, that is to say $Ta<Tb<Tc$ holds true. The layers may be arranged in a ring-shaped fashion and adjacently. The provision of three partly transmissive layers results in a particularly efficient weighing up between a uniform light emission and simple production.

By way of example, the first transmittance Ta can be between 15% and 30%, e.g. between 20% and 30%, specifically approximately 23%. The second transmittance Tb can be for example between 30% and 40%, e.g. approximately 35%. The third transmittance Tc can be for example between 50% and 70%, e.g. approximately 60%.

In yet another configuration, the light emission body is a scattering body. In this regard, a particularly uniform light emission is made possible. By way of example, scattering particles or air bubbles can be distributed in the light emission body. In various embodiments, air bubbles can be present with a proportion by volume of 0.1% in the light emission body. Alternatively or additionally, the light can be coupled out by means of a layer of scattering material that is applied on the outer side of the light emission body (e.g. on the light emission area thereof). Alternatively or additionally, an effective coupling out of the light can be achieved by means of an—e.g. three-dimensional—structuring and/or a roughening of the light emission area of the light emission body.

In a configuration that may be provided for reducing or avoiding light losses, the concentrator is embodied in a reflective fashion on its side wall (i.e. outside its light entrance area and its light exit area). For this purpose, the side wall can be covered with a reflective layer, e.g. with a specularly reflective layer, e.g. with a partly transmissive layer having a reflectance of 96% or more.

For the same purpose, e.g. an area of the light emission body that is situated opposite the light entrance area can also be embodied in a reflective fashion, e.g. in a diffusely reflective fashion. The light emission area of the light emission body can then correspond e.g. to the surface thereof outside the light entrance area and the reflective area. If the light emission body is cylindrical, then e.g. that circular end area which is situated opposite the end area serving as a light entrance area can be embodied in a reflective fashion.

In one configuration, furthermore, a light guiding adapter is disposed upstream of the concentrator—with respect to a light propagation direction—, which light guiding adapter, at its light incidence area, is separated or spaced apart from the at least one semiconductor light source by the gap and, at its light exit area, transitions into the light entrance area of the concentrator. This affords the effect that light can be guided from the at least one semiconductor light source to the concentrator with only low light losses, specifically even if a shape of the "light source area" occupied by the emission area or light emitting surface of the at least one semiconductor light source deviates from the shape of the light entrance area of the concentrator. By way of example, the shape of the light source area can be square, while the shape of the light entrance area of the concentrator is circular. Moreover, the length of the adapter can be used to accurately set a position of the light emission body, e.g. the distance thereof from the at least one semiconductor light source. The light source area may also include interspaces situated between the light emitting surfaces or emission areas of a plurality of semiconductor light sources.

In one development, the light emission areas of the semiconductor light source(s), e.g. LED chips, are arranged parallel to a planar light incidence area of the adapter. The light incidence area of the adapter can, however, also overarch the semiconductor light source(s), e.g. LED chips, in a dome-like manner. The semiconductor light source(s) can then be accommodated e.g. in the dome-like recess of the adapter. The LED chips can also be covered with a transparent layer, e.g. with a protective layer. The gap can thus generally be present at any desired location between the LED chips and the concentrator.

In one development that may be provided for particularly effectively avoiding light losses, a refractive index of the concentrator and a refractive index of the light emission body in each case have a sufficiently large value. It may be provided if it holds true for the refractive index n2 of the concentrator and for the refractive index n3 of the light emission body that they are greater than a square root of the ratio between the light source area A1 and the light exit area of the concentrator or the light entrance area A2 of the light emission body. This condition can also be written as: n2, n3>(A1/A2)^0.5.

Said refractive index n2 and/or n3 can be e.g. at least 1.7, e.g. at least 1.76.

In one configuration, moreover, the light emission body has a higher refractive index n3 than the concentrator since the light distribution in the light emission body can be improved in this way, e.g. a refractive index n3 of at least 1.8, e.g. of 1.83.

In one configuration, in addition, the concentrator is a CPC ("Compound Parabolic Concentrator")-like concentrator or includes such a CPC-like concentrator. Such a concentrator is an almost ideal concentrator, that is to say that it dilutes (increases) the etendue only to an insignificant extent. In addition, the associated light exit area is a planar circular area, which makes a transition to a for example cylindrical light emission body particularly simple.

The Compound Parabolic Concentrator(CPC)-like concentrator can be e.g. a "pure" CPC concentrator having a contour that is parabolic in longitudinal section, or a so-called angle transformer. In the case of the angle transformer, which can also be referred to as "θi/θo concentrator", a section having a frustoconical contour is adjacent to a section having a parabolic contour. While the pure CPC concentrator emits into an entire half-space at its light exit area, the angle transformer emits light only at an angle with respect to the light exit area, e.g. conically. With the use of the angle transformer, the light emission body can emit light particularly uniformly, e.g. if the light emission body is a cylindrical light emission body whose end face corresponds to the light exit area of the angle transformer. A "pure" CPC concentrator is described in greater detail for example in R. Winston, J. C. Minano, P. Benitez: "Nonimaging Optics", Elsevier Academic Press, chapter 4.6: The Compound Parabolic Concentrator. The angle transformer is described therein for example in greater detail in chapter 5.3: The CPC with exit angle less than $\pi/2$. Chapter 5.4 describes the concentrator for a light source with a finite distance.

The concentrator can have a non-concentrating optical waveguide section on the light input side and/or on the light output side.

In one configuration, moreover, the adapter together with the concentrator and together with the light emission body forms an integral, self-supporting ("light distribution") body, e.g. an elongate body having a common longitudinal axis. The light distribution body can be produced from one piece, for example by means of a single- or multi-component injection molding method. For this case, for example, the light distribution body may be formed without undercut(s). Alternatively, at least two of the associated components may have been produced separately and then fixedly connected to one another, e.g. by adhesive bonding or laser welding. The adapter, the concentrator and the light emission body, given the presence of an integral light distribution body, can also be regarded and referred to as corresponding sections thereof.

The adapter, the concentrator, and/or the light emission body can consist in each case of glass, of plastic and/or of light-transmissive ceramic. In various embodiments, the adapter and the concentrator may have been produced integrally from glass or plastic and the light emission body may have been produced separately therefrom as a ceramic body, and these two pieces may then subsequently have been connected to one another, e.g. adhesively bonded to one another. The ceramic body can e.g. be a ceramic phosphor or include ceramic phosphor.

For particularly simple production, the adapter, the concentrator and the light emission body can be embodied in a rotationally symmetrical fashion. Alternatively, the side areas of the adapter, of the concentrator and/or of the light emission body can be approximated by faceted areas, e.g. by outer contours that are like a polygon progression in cross section perpendicular to the longitudinal axis, for example octagonal outer contours or outer contours having even higher-fold symmetry. In this regard, a cylindrical light emission body can be approximated by a right prism having an octagonal base area.

In one development, the vehicle lamp includes at least three LED chips as semiconductor light sources, e.g. four LED chips. In one configuration thereof, four LED chips are arranged in a 2×2 matrix arrangement. As a result, a square light source area is achieved. Such an arrangement is particularly compact and is sufficiently approximated to a circular shape, such that light losses upon transition to the circular shape of the light exit area of the adapter can be kept small. This analogously applies to a 3×3 arrangement of nine LED chips, to a 4×4 arrangement of sixteen LED chips, etc.

In one configuration that may be provided for a square light source area, for example, the adapter has a square light incidence area and a round light exit area. However, the light incidence area can also have any other shapes in order to approximate a shape of an associated light source area shaped in any desired fashion, in principle.

In another configuration, moreover, the at least one semiconductor light source is introduced (e.g. embedded) in a depression of a diffusely reflective frame, into which depression in particular the adapter can also be inserted. The frame can reduce a leakage of light laterally out of the gap and also reduce an absorption of light in the spaces between a plurality of semiconductor light sources.

The frame can be applied on a heat sink in order to support an effective dissipation of heat from the at least one semiconductor light source. The heat sink can constitute the base or a part of the base, as a result of which a particularly effective heat dissipation via the lampholder becomes possible.

The light distribution body can be overarched by a cover that is light-transmissive at least in some regions. The cover can have a region that laterally surrounds the light distribution body (including concentrator, light emission body and, if appropriate, adapter), e.g. a hollow-cylindrical region. The lateral region can consist of glass or plastic. It can be transparent or translucent. The lateral region at an end side can transition into a light-nontransmissive cap which overarches the light distribution body e.g. toward the front. The cap can be for example black or reflectively coated on the inner side. The cap can be embodied in the shape of a spherical shell, such that, for example if it is reflectively coated on the inner side, it reflects the light emitted by the light emission body back onto the latter again. The cap can alternatively be embodied e.g. as a planar disk, e.g. if it is embodied in an absorbent fashion, e.g. is colored black.

The cover can be embodied as antireflective on one side or on both sides, e.g. be covered with an antireflection layer.

The (semiconductor) vehicle lamp may include a light distribution body, e.g. for replacing a conventional vehicle lamp having an incandescent filament, for example of the H7 type. The (semiconductor) vehicle lamp can also include a plurality of light distribution bodies, e.g. for replacing a conventional vehicle lamp having a plurality of incandescent filaments, for example of the H4 type.

Figure 2:
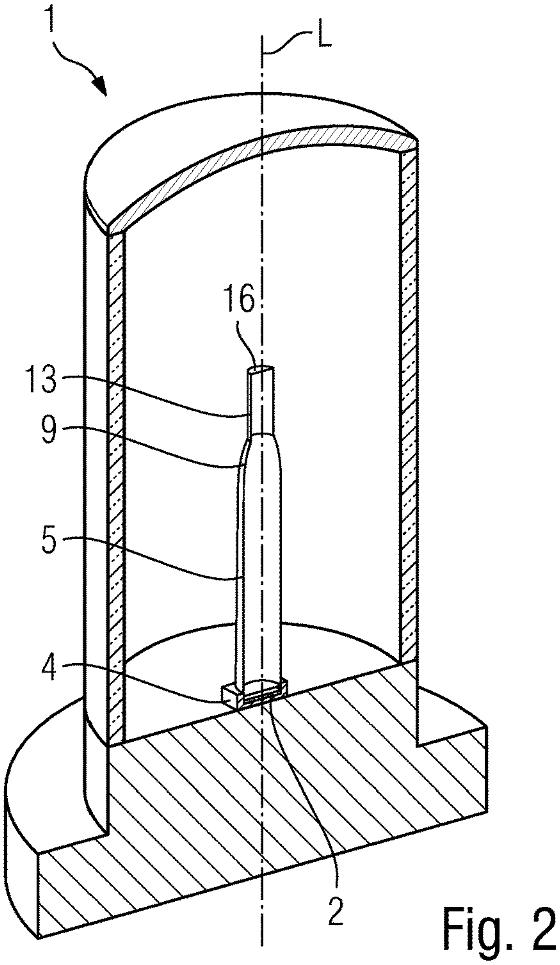
FIG. 2 shows the components from FIG. 1 as a sectional illustration in oblique view.

FIG. 1 shows, as a sectional illustration in side view, components of a vehicle lamp 1 embodied for replacing a conventional vehicle halogen incandescent lamp, e.g. of the H7 type. FIG. 2 shows the components from FIG. 1 as a sectional illustration in oblique view.

The vehicle lamp 1 includes a plurality of semiconductor light sources in the form of LED chips 2. The LED chips 2 are embodied as conversion LEDs and in this respect each include a chip (not illustrated) that emits—for example blue—primary light and a phosphor volume disposed optically downstream of said chip, e.g. a ceramic phosphor lamina. By means of the phosphor volume, in a manner known in principle, the primary light can be at least partly converted into secondary light of longer wavelength (e.g. into yellow primary light), such that blue-yellow or white mixed light can be emitted by the LED chips 2. The LED chips 2 can together generate e.g. a luminous flux of between 1200 and 1800 lumens, e.g. of 1600 lumens.

Figure 3:
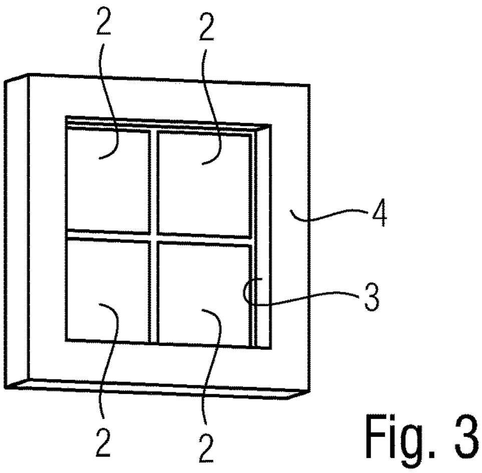
FIG. 3 shows, in an oblique view, a plurality of semiconductor light sources of the vehicle lamp.

FIG. 3 shows the LED chips 2 as a matrix-type 2×2 arrangement of a total of four LED chips 2. The LED chips 2 are accommodated in a rectangular ("receptacle") depression 3 of a plate-shaped frame 4. A light emitting surface area of the LED chips 2 is in each case approximately 1 mm2, and an associated edge around each of the LED chips 2 is approximately 0.05 mm. Therefore, the common "light source area" A1 is approximately 4·1.21 mm2=4.84 mm2. This results in an etendue E1=π·A1·n12=15.21 mm2·n12, wherein n1 corresponds to the refractive index of the material surrounding the LED chips 2, namely here for example air where n1=1.

Returning to FIG. 1 again, the vehicle lamp 1 furthermore includes a light guiding adapter 5, which passes on the mixed light emitted by the LED chips 2. The adapter 5 has an elongate basic shape and can be e.g. pin-shaped or columnar.

Figure 4:
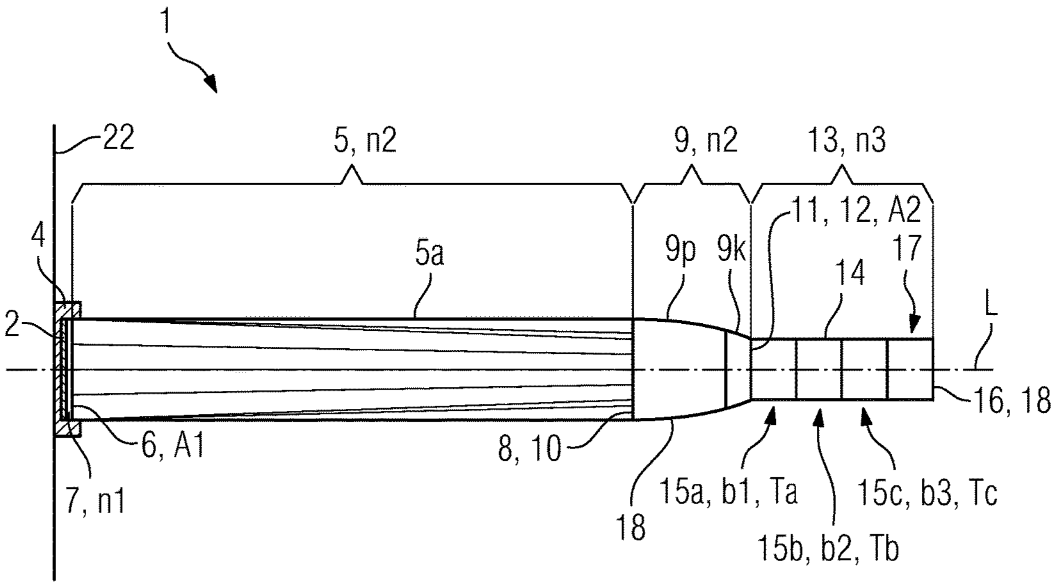
FIG. 4 shows an excerpt from FIG. 1.

The adapter 5 has a light incidence area 6 facing the LED chips 2, as shown in more specific detail in FIG. 4. The light incidence area 6 is situated opposite the LED chips 2 in a manner separated by a gap 7. Light which is emitted by the LED chips 2 and passes through the gap 7 is coupled into the adapter 5 via the light incidence area 6 and is guided within the adapter 5 to an opposite light exit area 8. Between the light incidence area 6 and the light exit area 8, the light is reflected internally in the adapter 5 if appropriate at the side wall 5*a* thereof, e.g. by Fresnel reflection or by total internal reflection. Alternatively or additionally, the side wall 5*a* can be embodied in a reflective fashion. The adapter 5 can thus e.g. also serve as an optical waveguide.

The light incidence area 6 of the adapter 5 is adapted in terms of its shape and size to the LED chips 2 or to the light source area A1 generated by the latter (e.g. rectangular—e.g. square—with area A1). It has a different basic shape than the light exit area 8, which has e.g. a circular basic shape. However, these areas 6 and 8 can have at least approximately the same size or lateral extent.

Figure 5:
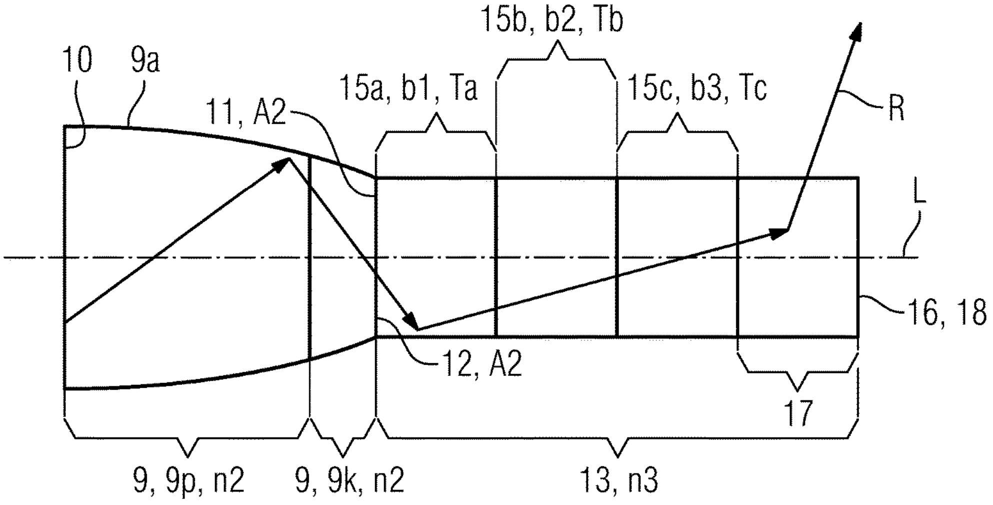
FIG. 5 shows an excerpt from FIG. 4.

At the light exit area 8 the adapter 5 transitions into an optical concentrator 9, the light entrance area 10 of which corresponds to the light exit area 8 of the adapter 5 and thus corresponds e.g. to a circular plane. The concentrator 9, which is shown in even greater detail in FIG. 5, concentrates the entering light toward its light exit area 11. The light exit area 11 thus has an appreciably smaller area than the light entrance area 10. The concentrator 9 thus tapers from the light entrance area 10 to the light exit area 11. The concentrator 9 has, by way of example, a rotationally symmetrical basic shape. The concentrator 9 can be embodied as a concentrator over its entire length or in some sections.

In order that the light which is emitted by the LED chips 2 can be radiated into a narrow concentrator 9 with particularly low losses, it may be efficient if the LED chips 2 are arranged compactly and, in addition, the light source area A1 is approximated as well as possible to the circular light entrance area 10. This is achieved particularly well by the 2×2 arrangement shown in FIG. 3, which constitutes the most compact arrangement for four LED chips 2.

The concentrator 9 can be embodied for example as a CPC ("Compound Parabolic Concentrator")-like concentrator. This affords the effect that such a concentrator scarcely or only insignificantly increases (dilutes) the etendue and it has a flat, circular light exit area 11. Instead of a "pure" CPC concentrator, for example modifications thereof can also be used, for example—as shown—a so-called angle transformer, which can also be referred to as a "θi/θo concentrator" 9, or similar concentrators. In the case of the θi/θo concentrator 9, a section 9*k* having a frustoconical contour is adjacent to a section 9*p* having a parabolic contour.

In the case of the $\theta_i/\theta_o$ concentrator 9, all light rays which are incident in the light entrance area 10 in a parallel manner at a predefined angle θi (not illustrated) and pass to the side surface of the parabolic section 9*p* are reflected onto an identical point on the edge of the light exit area 11. All light rays which are incident in the light entrance area 10 in a parallel manner at the predefined angle θi (not illustrated) and pass to the side surface of the frustoconical section 9*k* leave the θi/θo concentrator 9 at an angle θo in a parallel manner through the light exit area 11 thereof.

The light exit area 11 of the concentrator 9 is congruent with or corresponds to a light entrance area 12 of a light emission body 13. The light exit area 11 of the concentrator 9 thus corresponds here to the light entrance area 12 of the light emission body 13 and is a planar, circular area. The light that entered at the light entrance area 12 is emitted by the light emission body 13. The light emission body 13 here has a rotationally symmetrical, e.g. cylindrical, basic shape and light is emitted substantially through the associated lateral surface 14. The lateral surface 14 thus corresponds to the light emission area.

The light emission body 13 here has a diameter d of 1.41 millimeters and a length of four millimeters. The light entrance area 12 of the light emission body 13 thus has a surface area A2 of $\pi \cdot d^2/4=1.56$ mm$^2$, which results in an etendue E2 of π·A2·n2$^2$. n2 denotes the refractive index upstream of the light entrance area 12 of the light emission body 13, that is to say corresponds to the refractive index n2 of the concentrator 9.

In order to be able to simulate a light emission characteristic of an incandescent filament of a conventional vehicle halogen incandescent lamp as accurately as possible ("virtual incandescent filament" or "virtual filament"), a light emission which, over a length of the light emission body 13, is at least approximately uniform and e.g. is equally bright (relatively uniform specific light emission) may be provided. For this purpose, the light emission body 13 is covered along its longitudinal extent or along the longitudinal axis L with partly transmissive layers 15*a*, 15*b* and 15*c* applied in a ring-shaped fashion in series. Specifically, a first ring-shaped partly transmissive layer 15*a* attaches to the light entrance area 12 and extends for a predefined width b1 in the direction of the free end face 16. That is followed by a second ring-shaped partly transmissive layer 15*b* having a width b2, and that by a third ring-shaped partly transmissive layer 15*c* having a width b3. A ring-shaped section 17 of the lateral surface 14 remains uncoated between the third partly transmissive layer 15*c* and the free end face 15. An associated transmittance Ta, Tb and Tc of the layers 15*a*, 15*b* and 15*c*, respectively, increases with increasing longitudinal distance along the longitudinal axis L, that is to say that $Ta<Tb<Tc$ holds true. By way of example, Ta=23%, Tb=35% and Tc=60% can hold true. In order to avoid light losses, a side wall 9*a* of the concentrator 9 and the free end face 16 can be reflectively coated, e.g. covered with practically specularly reflective layers 18 having a reflectance of 96% or more. The absorptances of all the layers should be as low as possible, such that the non-transmitted part of the light is reflected practically completely.

The free end face 16 can also have different shapes than the flat circular disk shape shown. It can for example be curved, e.g. curved spherically, e.g. hemispherically. It can for example also be shaped in a conically projecting or recessed fashion. The free end face 16 can be embodied as specularly or diffusely reflective.

In order to achieve an even more efficient light emission by the light emission body 13 (as indicated by the light ray R), the light emission body 13 can be embodied as a scattering body. For this purpose, it may include for example air bubbles, e.g. with a proportion by volume of 0.1%. The light can scatter at the air bubbles in order to be coupled out from the lateral surface 16 to a greater extent.

Since E1 should be less than or equal to E2, a low refractive index n1 may be provided. For this purpose, the LED chips 2 here may be surrounded by air having a refractive index n1=1, namely the (air) gap 7. It follows from E2≥E1 that here n2≥1.7, e.g. n2≥1.76, should be the case. If the refractive index n2 is smaller, this results in light losses. It may be efficient if the refractive index of the adapter 5 and/or the refractive index n3 of the light emission body 13 are/is greater than 1.7, e.g. greater than 1.76. In order to expediently influence the light intensity distribution in the virtual filament by means of light refraction upon entry in said filament, the refractive index n3 of the light emission body 13 can be even greater than 1.76, e.g. can be 1.83. For the further avoidance of light losses, both the adapter 5 and the concentrator 9 consist of a transparent material.

Generally, it may be efficient if the refractive indices n2 of the concentrator 9 (and, if appropriate, adapter 5) and n3 of the light emission body 13 are greater than square root (A1/A2).

The vehicle lamp 1 thus includes a plurality of LED chips 2 and the light emission body 13. The concentrator 9 may be arranged between the LED chips 2 and the light emission body 13, the light entrance area 9 of said concentrator being separated from the LED chips 2—via the adapter 5—by the gap 7.

The adapter 5, the concentrator 9 and the light emission body 13 are embodied as an integral, self-supporting ("light distribution") body having a longitudinal axis L. The light distribution body 4, 9, 13 can be produced from one piece, for example by means of a single- or multi-component injection molding method. For this case, for example, the light distribution body 4, 9, 13 may be formed without undercut(s). Alternatively, at least two of the associated components may have been produced separately and then fixedly connected to one another, e.g. by adhesive bonding or laser welding. The adapter 5, the concentrator 9 and the light emission body 13, given the presence of the light distribution body 4, 9, 13, can also be regarded and referred to as corresponding sections thereof.

The adapter 5, the concentrator 9, and/or the light emission body 13 can consist in each case of glass, of plastic and/or of light-transmissive ceramic.

For particularly simple production, the adapter 5 can be embodied in a rotationally symmetrical fashion. If the etendue of the light source area A1 is similar to the etendue of the light entrance area 12 of the light emission body 13, the rotationally symmetrical adapter 5 will bring about a somewhat higher light loss than an adapter 5 having a square light incidence area 6.

The side surfaces of the adapter 5, of the concentrator 9 and/or of the light emission body 13 can be approximated by faceted areas, e.g. by outer contours that are like a polygon progression in cross section perpendicular to the longitudinal axis L, for example octagonal or even higher outer contours. In this regard, a cylindrical light emission body 13 can be approximated by a right prism having an octagonal base area.

The adapter 5 can have a length that is set such that the light emission body 13 is situated at a position at which the incandescent filament is situated in a conventional lamp.

Figure 6:
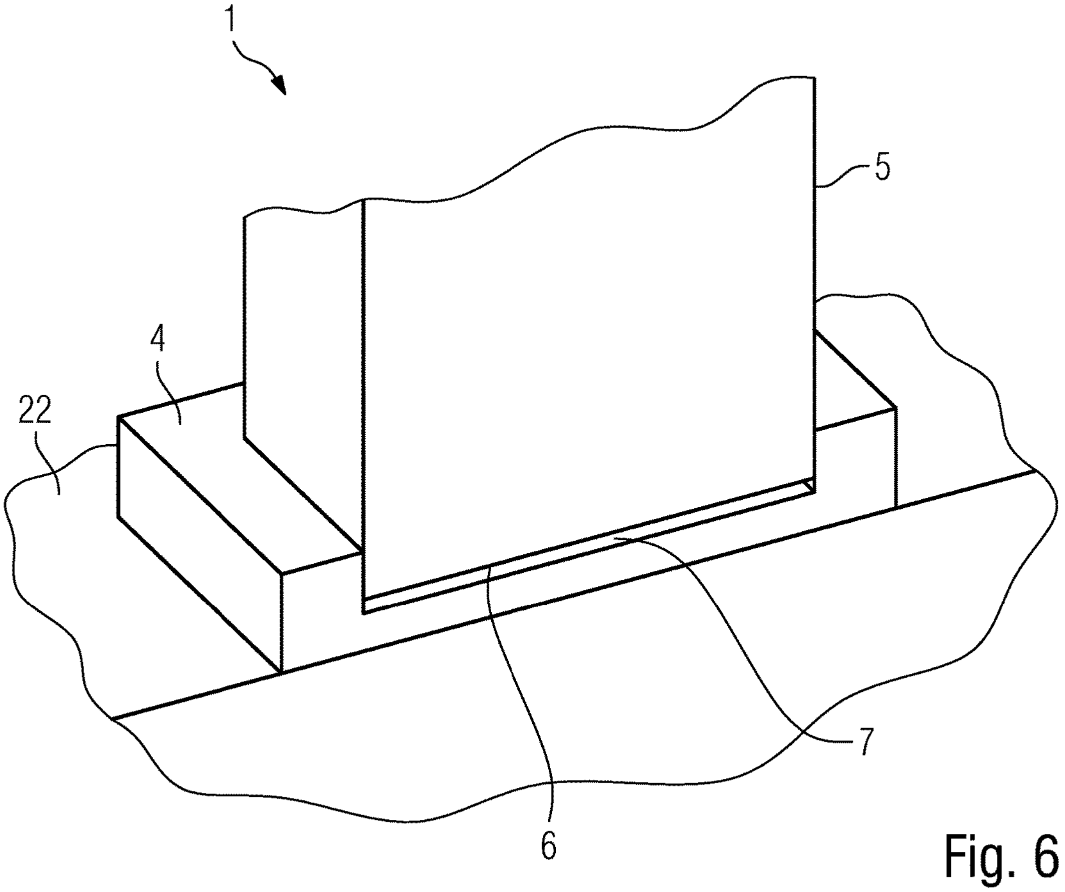
FIG. 6 shows an excerpt from FIG. 2.

FIG. 6 shows an excerpt from FIG. 2 in the region of the frame 4. The frame 4 consists of diffusely reflective material in order to further improve a luminous efficiency. The frame 4 may be an injection-molded part composed of silicone colored white. The white coloring can be achieved by means of titanium oxide pigments, for example. The adapter 5, in the region of its square light incidence area 6, is fitted into the depression 3 of the frame 4. The frame 4 reduces a leakage of light laterally out of the gap 7 and also an absorption of light in the spaces between the LED chips 2.

Returning to FIG. 1 and FIG. 2 again, the light distribution body 4, 9, 13 is overarched by a cover 19, which here is surrounded laterally by a light-transmissive, e.g. transparent, cylindrical region 20. The cylindrical region 20 can consist of glass. The cylindrical region 20 at an end side transitions into a light-nontransmissive cap 21 that overarches the light distribution body 4, 9, 13 toward the front. The cap 21 can be for example black or reflectively coated on the inner side. The cap 21 here is embodied in the shape of a spherical shell, such that, if it is reflectively coated on the inner side, it reflects the light emitted by the light emission body 13 to the latter again. The cap 21 can alternatively be embodied as a planar disk, particularly if it is embodied in an absorbent fashion, e.g. is colored black. The transparent cylindrical region 20 can be embodied as antireflective on one side or on both sides, e.g. can be covered with an antireflection layer.

The other end face of the cylindrical region 20 and the frame 4 are seated on a heat sink 22, which can also form the base of the vehicle lamp 1 or can transition into a base.

The occupation space for the light distribution body 4, 9, 13 that is formed by the heat sink 22 and the cover can be gas-tight, for example. It can then e.g. be at reduced pressure or be filled with a gas (including a gas mixture) different than the surroundings, e.g. with noble gas.

The light incidence area 6 of the adapter 5 can also be covered with an antireflection layer.

The light distribution body 4, 9, 13 can be held by a carrier (not illustrated). The carrier can be fitted to the heat sink 22, for example. The carrier can be fitted e.g. to a reflectively coated concentrator 9 or to the free end face 2 of the light emission body 13.

Although various aspects of this disclosure have been more specifically illustrated and described in detail by the exemplary embodiment shown, nevertheless the invention is not restricted thereto and other variations can be derived therefrom by the person skilled in the art, without departing from the scope of protection of the invention.

In this regard, the wavelength-converting phosphor need not be present on the LED chips, but rather can be present e.g. in and/or on the light emission body 13. This can also be referred to as "remote phosphor". By way of example, the phosphor can be applied to the—e.g. cylindrical—lateral surface 14, e.g. as a thin layer. The light emission body can alternatively or additionally include particles of ceramic phosphor or even consist entirely of ceramic phosphor.

Generally, "a(n)", "one", etc. can be understood to mean a singular or a plural, in particular in the sense of "at least one" or "one or a plurality", etc., as long as this is not explicitly excluded, e.g. by the expression "exactly one", etc.

Moreover, a numerical indication can encompass exactly the indicated number and also a customary tolerance range, as long as this is not explicitly excluded.

LIST OF REFERENCE SIGNS

Vehicle lamp 1
LED chip 2
Depression 3
Frame 4
Adapter 5
Side wall of the adapter 5*a*
Light incidence area of the adapter 6
Gap 7
Light exit area of the adapter 8
Concentrator 9
Side wall of the concentrator 9*a*
Section having a frustoconical profile 9*k*
Section having a parabolic profile 9*p*
Light entrance area of the concentrator 10
Light exit area of the concentrator 11
Light entrance area of the light emission body 12
Light emission body 13
Lateral surface 14
First partly transmissive layer 15*a*
Second partly transmissive layer 15*b*
Third partly transmissive layer 15*c*
End face 16
Ring-shaped section of the light emission body 17
Specularly reflective partly transmissive layer 18
Cover 19
Cylindrical region of the cover 20
Cap of the cover 21
Heat sink 22
Light source area A1
Area of the light entrance area of the concentrator A2
Width of the first partly transmissive layer b1
Width of the second partly transmissive layer b2
Width of the third partly transmissive layer b3
Refractive index of the material surrounding the LED chips n1
Refractive index of the concentrator n2
Refractive index of the light emission body n3
Longitudinal axis L
Light ray R
Transmittance of the first partly transmissive layer Ta
Transmittance of the second partly transmissive layer Tb
Transmittance of the third partly transmissive layer Tc

What is claimed is:

1. A vehicle lamp, comprising:

at least one semiconductor light source;

at least one light emission body; and a concentrator arranged between the at least one semiconductor light source and the respective light emission body;

wherein a larger light entrance area of the concentrator is separated from the at least one semiconductor light source by a gap;

wherein the concentrator at its smaller light exit area transitions into the light emission body; and wherein the light emission body is covered with a plurality of partly transmissive layers having different transmittances;

wherein a first transmittance of a partly transmissive layer closest to the light exit area of the concentrator, a second transmittance of a partly transmissive layer further away from the light exit area, and a third transmittance of a partly transmissive layer even further away from the light exit area become progressively greater.

2. The vehicle lamp of claim 1, wherein the partly transmissive layers exhibit a higher transmittance with greater distance from the light exit area of the concentrator.

3. The vehicle lamp of claim 1, wherein at least one partly transmissive layer consists of alternating plies having higher and lower refractive indices or is a metallic layer.

4. The vehicle lamp of claim 1, wherein the light emission body is a scattering body.

5. The vehicle lamp of claim 1, wherein a side wall of the concentrator is covered with a reflective layer.

6. The vehicle lamp of claim 1, wherein a light guiding adapter is disposed upstream of the concentrator, which light guiding adapter, at its light entrance area, is separated from the at least one semiconductor light source by the gap and, at its light exit area, transitions into the light entrance area of the concentrator.

7. The vehicle lamp of claim 5, wherein the adapter together with the concentrator and together with the light emission body forms an integral, self-supporting body.

8. The vehicle lamp of claim 5, wherein the at least one semiconductor light source is introduced in a depression of a diffusely reflective frame, into which depression the adapter is also inserted.

9. The vehicle lamp of claim 6, wherein the adapter has an angular light incidence area and a round light exit area.

10. The vehicle lamp of claim 1, wherein the light emission body has a higher refractive index than the concentrator.

11. The vehicle lamp of claim 1, wherein at least one of a refractive index of the concentrator or of the adapter is greater than a square root of a ratio between a light source area and a light entrance area of the light emission body.

12. The vehicle lamp of claim 11, wherein at least one of a refractive index of the concentrator or of the adapter is greater than 1.7.

13. The vehicle lamp of claim 1, wherein the concentrator is or comprises a CPC-like concentrator.

14. The vehicle lamp of claim 13, wherein the concentrator is or comprises an angle transformer.

15. The vehicle lamp of claim 1, wherein the semiconductor light sources are arranged in a 2×2 matrix arrangement.

16. The vehicle lamp of claim 1, wherein each partly transmissive layer of the plurality of partly transmissive layers coat the light emission body in a ring-shaped fashion.

17. The vehicle lamp of claim 16, wherein the ring-shaped plurality of partly transmissive layers are arranged in series.

18. The vehicle lamp of claim 16, wherein a first partly transmissive layer has a first transmittance (Ta), a second partly transmissive layer has a second transmittance (Tb), a third partly transmissive layer has a third transmittance (Tc), until an 'X' partly transmissive layer has an 'x' transmittance (Tx), such that Ta<Tb<Tc . . . <Tx.

* * * * *